William J. Metrailer
Edward D. Stokes      Inventors

By *George J. Silhavy*      Attorney

United States Patent Office 2,807,393
Patented Sept. 24, 1957

2,807,393

APPARATUS FOR TRANSFERRING FINELY DIVIDED SOLIDS FROM ZONE TO ZONE

William J. Metrailer and Edward D. Stokes, Baton Rouge, La., assignors to Esso Research and Engineering Company, a corporation of Delaware Application December 14, 1954, Serial No. 475,198

4 Claims. (Cl. 222—194)

The present invention relates to an apparatus for the handling of finely divided solids. More particularly, the invention relates to an apparatus for transferring finely divided solids in measured amounts from one zone into another, the apparatus being especially adapted for accomplishing such transfer at very low flow rates.

In the operation of processes which involve the handling of finely divided solids and requiring the transfer of measured amounts of such solids from one zone of the operation to another, it is frequently difficult to accomplish the desired result without excessive compacting of the solid material and with accurate control of the transfer rate. This is especially true when such transfer is required between zones of different pressure characteristics, and also where the rate of transfer may be below about 50 lbs. per hour. Various systems have been devised in the past for accomplishing the transfer of solid materials, fluidized or not, including star feeders, multiple high pressure lock hoppers or blow cases, and other comparable mechanical means. Most of such means as previously employed have demonstrated many uneconomical and otherwise undesirable characteristics including a tendency to pack the finely divided solids so as to cause delivery in a lump form, or to require excessive amounts of fluidizing or injection gases in order to maintain fluidity of the solid material. Also, various forms of pumps have been devised for handling finely divided solid materials, attempting to adapt liquid handling systems to the handling of finely divided solid materials. Most of the devices, of which a few have been mentioned, have been substantially unsuccessful in part due to the abrasive and erosive effect of the finely divided solid materials on mechanical sealing elements and between moving parts. Such devices as previously developed have also been found unsuccessful in handling minimal amounts of finely divided solid materials due to the fact that they have not lent themselves to any considerable reduction in size which would permit them to handle the smaller amounts of solid materials specifically contemplated by the present invention.

It is an object of the present invention to provide an apparatus particularly adapted to the handling of finely divided solid materials without excessive fluidization and with a minimum amount of abrasive wear of the moving parts involved. It is a further object of the present invention to provide such an apparatus wherein the need for introduction of fluidization gases is eliminated or reduced to an absolute minimum. It is also an object of the present invention to provide an apparatus which, without complicated means for sealing one zone from another, may be used to transfer finely divided solid materials from one pressure zone to a zone of high pressure. A still further object of the invention is to provide an apparatus for the transfer of finely divided solids wherein such transfer is accomplished substantially by gravity displacement of the solids.

The invention and the objects thereof may be more fully understood from the following description when read in conjunction with the accompanying drawings in which representative forms of the apparatus are illustrated schematically and at least partly in vertical section and wherein.

Figure 1:
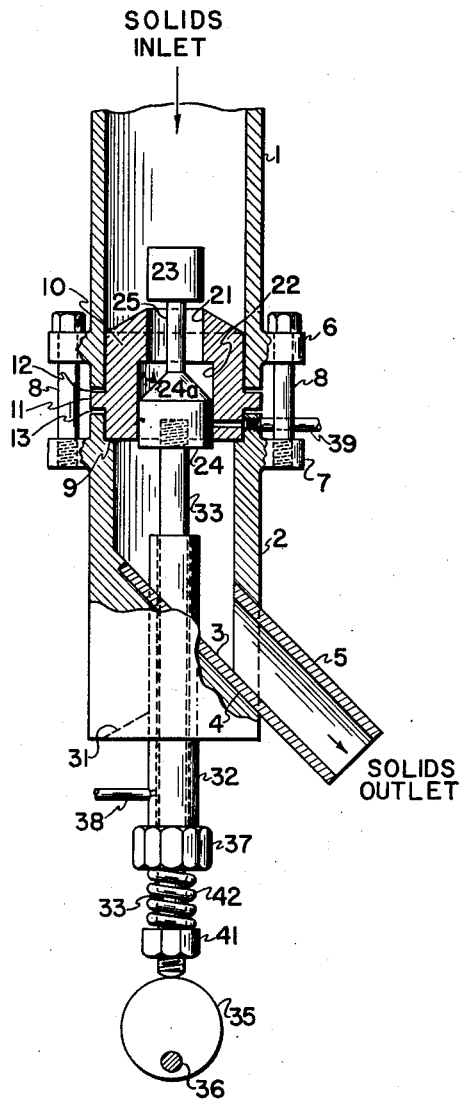
Fig. 1 is a view partly in vertical section of a typical structure according to the invention showing the apparatus in operating position to accept delivery of a measurable amount of finely divided solids material from a container therefor and including a representative showing of operating means to accomplish the solids transfer contemplated.

Referring now to the drawings in greater detail, the apparatus will be described with reference to a system for the handling of granular solid materials, and especially one adapted for the handling of finely divided solids having particle sizes in the range of from about 8 to about 325 mesh. In the drawings the numeral 1 designates the lower end of a standpipe container for the solid materials. Alternately this may be the outlet of a solids hopper or any other similar container. The numeral 2 designates a hollow receiver having an inner bottom wall portion 3 which is downwardly inclined toward an outlet port defined in a side wall of the receiver. Specific conformation of the inner wall portion is critical only to the extent that it should provide for gravity flow of solid material toward the port 4. In other words, the degree of inclination of the bottom wall portion should be greater than the angle of repose of the solid material handled. In the form of the apparatus as shown, the port 4 is adapted to receive a discharge conduit 5 communicating with and opening from the interior of the receiver of the lowest point thereof. Also, as shown, the solids container or standpipe element 1 and the receiver 2 are provided with flange portions 6 and 7 for bolted connection as by bolts 8.

The upper end of the receiver 2 is interiorly enlarged to provide an outer facing shoulder 9 adapted to receive a cylindrical casing or barrel member 10. The casing 10 extends upwardly beyond the upper end of the receiver 2 and is adapted for insertion into the lower end of the container 1. At each end the casing 10 is provided for substantially frictional, fluid tight engagement with the inner walls of the receiver and container respectively. An annular flange portion 11 exteriorily of the casing 10 is provided for disposition between the upper end of the receiver and the lower end of the container. Suitable annular gaskets 12 and 13 are compressed between the flange portion 11 and the respective ends of the container and receiver in order to complete a fluid tight seal between these elements. The casing 10 defines an interior passageway longitudinally thereof. The passageway includes a first portion 21 and a second portion 22 of relatively greater diameter and length. The capacity of the annularly enlarged second portion 22 is substantially greater than that of the initial or first portion 21.

Disposed within the casing 10 is a double headed piston or valve element consisting of an upper head 23, a lower head 24 and a rigid connecting rod 25 of substantially smaller diameter than either of the head portions 23 and 24. The head 23 is of a diameter adapted to fit closely within the cylindrical, initial passage or barrel portion 21 for reciprocal movable relation into and out of this portion. The head 23 is of an overall length substantially equal to the length of the passageway portion 21. The other head 24 is closely fitted to the passageway portion 22 for reciprocal movement into and out of that portion. The head 24 is provided with an upper end of substantially conical conformation, indicated by the numeral 24a, wherein the angle of surface inclination is at least as great, and preferably slightly greater, than the angle of repose of the solid material being handled. The length of the head 24 from the lower end thereof to the junction thereof with the connecting rod 25 is not substantially greater than the length of the passageway portion 22. The connecting rod 25 is of a length substantially equal to the length of the passageway portion 22. As thus constructed, the piston element may be moved longitudinally and reciprocally of the casing in such fashion that at all times one end or the other of the passageway will be closed by one or the other head portions, i. e. when the passageway portion 21 is in open communication with the container 1, the passageway 22 will not be in open communication with the receiver 2 and vice versa.

The receiver 2 is also provided with a passageway 31 extended coaxially thereof through its bottom wall portion. In this passageway is disposed a sleeve 32, which is in fixed fluid tight relation to the passageway walls and extends upwardly through the bottom wall beyond the upper limit of the port 4 and downwardly beyond the bottom wall as shown. A piston rod or valve stem 33 is extended through the sleeve 32 into threaded engagement with the head portion 24 at its upper end. In the form of the apparatus shown, the rod 33 extends beyond the sleeve 32 at the lower end thereof into engagement at its lower end with an operating means such as a cam 35 mounted on a shaft 36. The lower end of the sleeve 32 is provided with suitable packing held in place as by packing gland nut in threaded engagement with the end of the sleeve 32. This provides a fluid tight seal between the sleeve and the rod or stem 33. The rod or stem 33 is of a diameter slightly smaller than the inner diameter of the sleeve 32, providing a narrow annular space between these elements. A conduit 38 opens through one wall of the sleeve 32 into communication with the annular space between the inner surface of the sleeve and the outer surface of the rod 33. A similar conduit connection 39, if desired, may be made to the lower portion 22 of the passageway through the casing 10 and at a level therein such that the head 24 will substantially provide a seal for the inner end of the conduit until such time as the upper head 23 has entered and closed the passageway portion 21. In order to provide a cam follower action for the rod 33 a means such as a flanged nut 41 is applied to the lower end of the rod with a helical spring member disposed for compression between the nut 41 and the nut 37.

Figure 2:
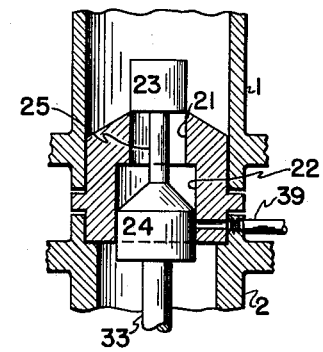
Fig. 2 is a similar showing of a limited portion of the apparatus of Fig. 1 illustrating the relationship of elements at a first intermediate operational stage.
Figure 3:
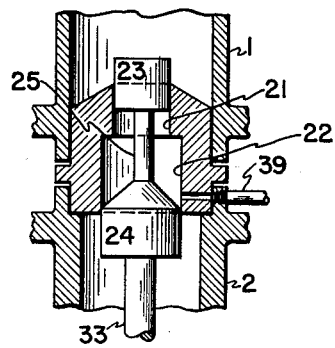
Fig. 3 is a showing similar to that of Fig. 2 illustrating a second operational stage.
Figure 4:
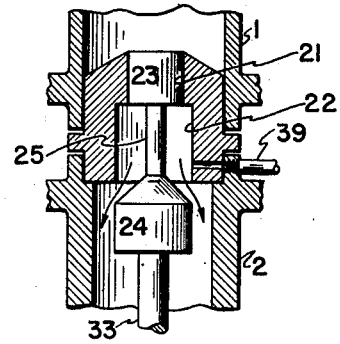
Fig. 4 is a showing similar to that of Figs. 2 and 3 illustrating the relationship of apparatus elements as the measured amount of finely divided solids is delivered into a second zone.

The apparatus as shown in Figs. 2 to 4, inclusive, are structurally identical with the apparatus as shown in Fig. 1. Fig. 2, however, shows the relationship of the several parts of the apparatus at the instant that the head portion 23 is just entering or just leaving the passageway 21. At this instant the passageway is closed at both ends against either the entrance of solid materials from the container 1 or the discharge of solid materials into the receiver 2.

In Fig. 3 the operating relationships are shown at the instant that the head portion 24 is just about to leave or enter the passageway portion 22. At this instant the passageway is also closed but where a conduit such as 39 is connected to the chamber as shown in these drawings the inner end of the conduit is exposed and communicates with the passageway 22 in the area between the two head portions.

In Fig. 4 the operating relationship of the respective parts is shown at the lowermost end of the piston or valve stroke. As shown, at this instant the head portion 24 is fully withdrawn from the passageway portion 22, while the head portion 23 is completely contained within the passageway portion 21. In this position of the piston or valve mechanism the passageway 22 is in open communication, over the conical surface of the head portion 24, with the interior of the receiver 2. In this position also, if the conduit 39 is employed, it will be in direct communication with the passageway 22.

In the operation of the apparatus as illustrated, and as indicated by the stage sequence of the Figures from 1 to 4, inclusive, when the piston or valve element including the head portions 23, 24 and the connecting rod 25 are raised to the upper limit by the cam 35, as shown in Fig. 1, the casing passageway is in communication with the container or standpipe 1. In this position, finely divided solid materials will flow by gravity into the casing passageway through the portion 21. As the piston is withdrawn downwardly by the action of the spring 42 the entrance to the passageway portion 21 is closed by the head portion 23 substantially in the manner shown in Fig. 2. Also as the head portion 24 moves downwardly in the passageway portion 22 the total volume of the passageway is increased and that portion of the solids initially contained above the intermediate level at the passageway enlargement will be free to fall by gravity into the portion 22 thus continuously clearing the passageway 21 of solid materials in advance of the downward movement of the head portion 23 and effectively reducing the likelihood of abrasive contact between the head 23 and wall portions 21 and the solid materials. Then, as indicated by Fig. 3, the continued downward movement of the piston or valve head assembly eventually draws the head portion 23 into the passageway 21 so as substantially to completely fill the passageway portion 21 and most effectively seal this portion.

At this stage of the operation the passageway is still sealed against discharge of the solid materials therefrom. Also, if a conduit connection such as 39 is provided, at this stage of the operation an aerating gas may be introduced, the inner end of the conduit having been exposed above the upper conical surface of the head portion 24. Continued downward movement of the piston assembly under the influence of the action of spring 42 finally withdraws head portion 24 from the passageway 22. At this stage of the operation the solid material supported on the conical upper surface of the head portion 24 is free to discharge from the passageway by gravity alone, or partially under the influence of an aerating gas which may be injected through the conduit 39. Where the operation involves the introduction of solid materials from a first initial pressure zone to a second higher pressure zone it should be apparent that as the head portion 24 is withdrawn from the passageway portion 22 the pressure which may initially exist above the head 24 in the passageway portion 22 will equalize with the pressure existing in the receiver 2, and simultaneously tend to produce a certain fluidization of the solid materials above the head portion 24 due to the effect of the pressure drop produced through the opening between the head portion 24 and the casing 10. The solid materials thus discharged over the head portion 24 will be free to fall by gravity to the bottom of the receiver 2 and thence over the inclined inner surface of the bottom to be discharged through the conduit 5 on the other side of the operating cycle. As the head 24 enters the passageway 22 the clearance provided by the conical upper surface of the head 24 will permit the introduction of an aeration gas through the conduit 39 during an initial portion of the stroke such as to reduce the tendency of the solid material to cling to the walls of the passageway. The conduit 38 is provided for the purpose of introducing a small quantity of a pressurized gas into the space between the sleeve 32 and the rod 33 so as substantially to prevent the entrance of small particles of the solid materials handled into the annular space around the rod 33.

The capacity of the apparatus as illustrated is only limited by the free volume of the passageway at that point at which the head portion 24 is fully inserted in the passageway portion 22 and as determined by the throw and cycle rate of the cam 35 or other equivalent means employed for reciprocating the rod 33. The cycle rate may be varied for a given cam, or other means provided, by variation of the rotational speed of shaft 36. Also at a given speed the delivery volume for a given passageway volume may be varied as by selection of a cam or other actuating means designed to provide a specific throw or travel distance for the rod 33. Effective operation of the apparatus in the manner described above is dependent primarily on the free volume of the passageway portion 22 substantially at the instant that the head portion 23 enters the passageway portion 21 to seal the same. At that instant the combined volume of the passageway 21 and 22 must be slightly more than the volume of solid materials admitted during the stage in which the head portion 23 is removed from the passageway portion 21.

As an example of the construction and operation of the apparatus disclosed with a cylinder casing 10 having an upper passageway portion 21 of a diameter of 0.729 inch and a length of 0.75 inch and a lower passageway portion 22 having a diameter of 0.996 inch and a length of 1.125 inches receiving a piston or valve head assembly wherein the head portion 23 had a diameter and length substantially equal to that of the passageway portion 21 wherein the lower head portion 24 had a diameter substantially equal to that of the lower passageway portion 22 a sidewall dimension of 0.75 inch and an overall dimension of 1.125 inches providing a conical head with an inclination of 45° from the horizontal and a connecting rod portion 25 of a length of about 1 inch the apparatus was operated to deliver finely divided coke at the rate of 3 lbs. per hour while operating at about 2.5 cycles per minute. This operation was continued for about 21,000 cycles over a period of about 8 days. The volume of coke delivered per cycle showed a variation of only plus or minus 2%, and without aeration of either the lower passageway portion 24 or the lower portion of solids container 1.

The finely divided coke handled by this apparatus according to the foregoing example, was derived from a fluid coking operation and had the following particle size distribution.

|  | Weight percent on |
|---|---|
| 8 mesh | 0 |
| 20 mesh | 8 |
| 48 mesh | 14 |
| 60 mesh | 25 |
| 80 mesh | 74 |
| 100 mesh | 85 |
| 200 mesh | 98 |

The apparatus was also operated for metered delivery of a molybdenalumina hydroforming catalyst material having a particle size distribution as follows:

|  | Weight percent on |
|---|---|
| 60 mesh | 0 |
| 80 mesh | 0 |
| 100 mesh | 2 |
| 150 mesh | 20 |
| 200 mesh | 46 |
| 325 mesh | 84 |

In an operation with the hydroforming catalyst material employing a stainless steel piston or valve assembly and a brass cylinder, wear after 16,000 cycles at 2 to 6 cycles per minute was less than 0.002 inch on any one surface.

Although the apparatus and its method of operation have been described with specific reference to the handling of solids such as produced or used in a fluid coking process, or of finely divided catalyst material, it is contemplated that its usefulness will not be limited to the handling of any specific solid material. Likewise, while the apparatus according to this invention is particularly useful for handling such solid materials at transfer rates of fifty pounds per hour, or less, it is readily adaptable to the handling of such materials at higher transfer rates.

What is claimed is:

1. An apparatus for handling finely divided solid materials, comprising a container for said materials, having an outlet opening downwardly therefrom, a receiver for said materials having an inlet disposed in opposed, coaxial relation to and below said container outlet, a metering means communicating between said container and said receiver, said means including a plug connector having upper and lower end portions insertable into said container outlet and receiver inlet respectively in telescopic, substantially fluid tight relation to each, the upper end of said plug terminating in a frusto-conical portion extended into said container, said plug also defining a central bore longitudinally thereof and coaxial with said inlet and outlet, said bore consisting of an upper bore portion opening from said container through an orifice sharply defined at the juncture of the wall of said bore with the apex end of said frusto-conical plug portion, and a lower bore portion of greater length and diameter than said upper bore portion opening downwardly into said receiver, a metering valve disposed in said bore for reciprocal movement therein, said valve consisting of a first head portion adapted to be received in, and to completely fill said upper bore portion in closely fitted sealing relation to the walls thereof, a second head portion having a frusto-conical upper end, wherein the angle of inclination of said upper end is not less than the angle of repose of said finely divided solid material, and a lower portion adapted to be received in closely fitted sealing relation to the walls of said lower bore portion, and a spacer rod connecting the upper end of said second head portion to said first head portion in spaced relation longitudinally of said bore by a dimension substantially equal to the longitudinal dimension of said lower bore portion, and means for moving said valve reciprocally in said bore alternately to displace one head portion from said bore at one end, while inserting the other head portion into the other end.

2. An apparatus according to claim 1, wherein said container and said receiver are opposed conduit sections.

3. An apparatus according to claim 1, wherein said container is a vertical standpipe.

4. An apparatus according to claim 1, wherein said plug connector defines a radial passageway opening through the wall of said connector, said passageway having an inner end communicating with said lower bore portion at a lower level therein, and an outer end in communication with a fluid conduit connection adapted to introduce an aeration gas into said lower bore portion by way of said radial passageway, and wherein the inner end of said radial passageway is sealed by said second valve head portion at all times when said first valve head portion is not contained in said upper bore portion.

References Cited in the file of this patent

UNITED STATES PATENTS

| 1,616,646 | Ardin | Feb. 8, 1927 |
| 2,054,881 | Saunders | Sept. 22, 1936 |
| 2,243,454 | Collinge et al. | May 27, 1941 |

FOREIGN PATENTS

| 25,321 | Great Britain | Nov. 30, 1898 |
| 323,859 | Italy | Jan. 10, 1935 |